United States Patent
Hill et al.

(10) Patent No.: US 10,295,002 B2
(45) Date of Patent: May 21, 2019

(54) MULTI-PLATE BRAKE OR CLUTCH

(71) Applicant: Caterpillar Shrewsbury Limited, Shrewsbury, Shropshire (GB)

(72) Inventors: Richard Peter Hill, Shrewsbury (GB); Scott Laurence Mitchell, Church Stretton (GB)

(73) Assignee: Caterpillar Shrewsbury Limited, Shrewsbury (GB)

( * ) Notice: Subject to any disclaimer, the term of this patent is extended or adjusted under 35 U.S.C. 154(b) by 288 days.

(21) Appl. No.: 15/307,532

(22) PCT Filed: Feb. 26, 2015

(86) PCT No.: PCT/GB2015/050553
§ 371 (c)(1),
(2) Date: Oct. 28, 2016

(87) PCT Pub. No.: WO2015/166204
PCT Pub. Date: Nov. 5, 2015

(65) Prior Publication Data
US 2017/0051800 A1    Feb. 23, 2017

(30) Foreign Application Priority Data
Apr. 28, 2014 (GB) .................................. 1407423.1

(51) Int. Cl.
*F16D 55/40* (2006.01)
*F16D 13/68* (2006.01)
(Continued)

(52) U.S. Cl.
CPC ............. *F16D 55/40* (2013.01); *F16D 13/52* (2013.01); *F16D 13/683* (2013.01); *F16D 13/72* (2013.01);
(Continued)

(58) Field of Classification Search
CPC ........ F16D 55/40; F16D 13/52; F16D 13/683; F16D 13/648; F16D 13/72; F16D 13/74; F16D 25/123; F16D 65/853
See application file for complete search history.

(56) References Cited

U.S. PATENT DOCUMENTS 3,251,442 A * 5/1966 Aschauer ................ F16D 47/04
192/113.34
4,458,797 A     7/1984 Hawkins
(Continued)

FOREIGN PATENT DOCUMENTS

CN        101688569        3/2010
CN        201568469        9/2010
(Continued)

OTHER PUBLICATIONS

European Patent Office, International Search Report in International Patent Application No. PCT/GB2015/050553, dated Jun. 8, 2015, 2 pp.
(Continued)

*Primary Examiner* — Stacey A Fluhart

(57) ABSTRACT

Multi-plate brake or clutch includes a carrier, a fluid dispensing device and plurality of friction plates located around the carrier and the fluid dispensing device. The carrier includes a carrier body, a plurality of external splines located around a rim of the carrier body extending outwardly from the rim, and a passageway that extends through the carrier body to a passageway outlet. The fluid dispensing device includes a body defining a reservoir with an opening in fluid communication with the passageway outlet to allow fluid to be dispensed when a volume of fluid in the reservoir exceeds a predetermined volume.

17 Claims, 5 Drawing Sheets

(51) Int. Cl.
*F16D 25/12* (2006.01)
*F16D 65/853* (2006.01)
*F16D 13/72* (2006.01)
*F16D 13/74* (2006.01)
*F16D 13/52* (2006.01)

(52) U.S. Cl.
CPC .......... *F16D 13/74* (2013.01); *F16D 25/123* (2013.01); *F16D 65/853* (2013.01)

(56) References Cited

U.S. PATENT DOCUMENTS

| | | | |
|---|---|---|---|
| 4,782,931 A * | 11/1988 | Lederman | F16D 13/72 192/113.32 |
| 4,971,184 A | 11/1990 | Lederman | |
| 5,706,694 A * | 1/1998 | Bhookmohan | B21D 53/28 192/70.12 |
| 6,976,567 B2 * | 12/2005 | Kitabayashi | F16D 25/0638 192/113.34 |
| 7,383,932 B2 | 6/2008 | Miyazaki et al. | |
| 7,690,492 B2 * | 4/2010 | Gooden | F16D 25/123 192/113.32 |
| 2006/0054448 A1 | 3/2006 | Miyazaki et al. | |
| 2006/0113157 A1 | 6/2006 | Ichikawa et al. | |
| 2009/0194384 A1 | 8/2009 | Tsukuda et al. | |
| 2009/0308707 A1 | 12/2009 | Illerhaus et al. | |
| 2010/0065395 A1 * | 3/2010 | Baer | F16D 13/52 192/70.2 |
| 2012/0080284 A1 | 4/2012 | Torii et al. | |
| 2013/0102432 A1 | 4/2013 | Imai et al. | |
| 2013/0153355 A1 | 6/2013 | Kummer et al. | |
| 2014/0174877 A1 * | 6/2014 | Penz | F16D 13/72 192/70.12 |

FOREIGN PATENT DOCUMENTS

| | | |
|---|---|---|
| DE | 2835667 A1 | 2/1980 |
| DE | 10222813 B3 | 3/2004 |
| DE | 102010030740 A1 | 1/2012 |
| DE | 102012218257 B3 | 11/2013 |
| JP | 5-141446 A | 6/1993 |
| JP | 5141446 | 6/1996 |
| JP | 2010-249269 A | 11/2010 |
| WO | WO 2007/142366 A1 | 12/2007 |

OTHER PUBLICATIONS

United Kingdom Intellectual Property Office, Search Report in United Kingdom Patent Application No. GB1407423.1, dated Nov. 6, 2014, 1 pp.

* cited by examiner

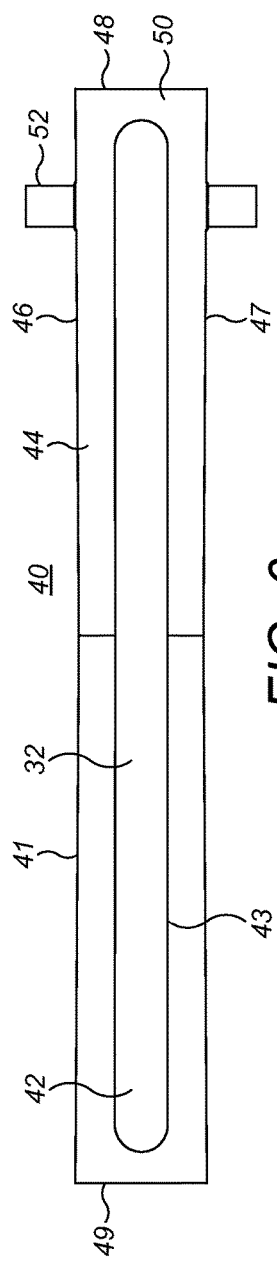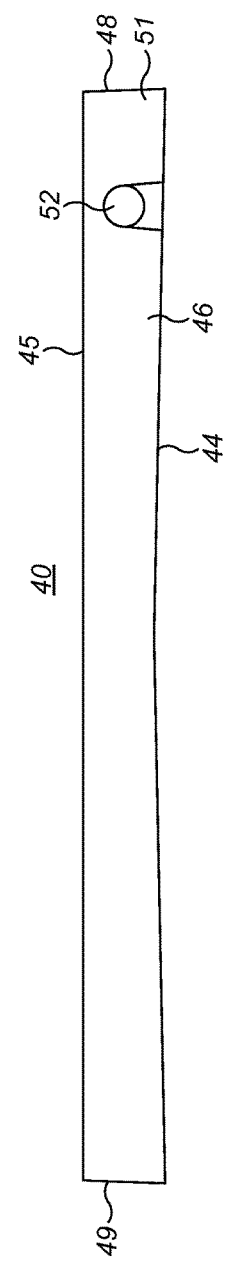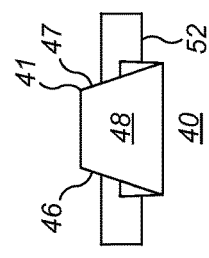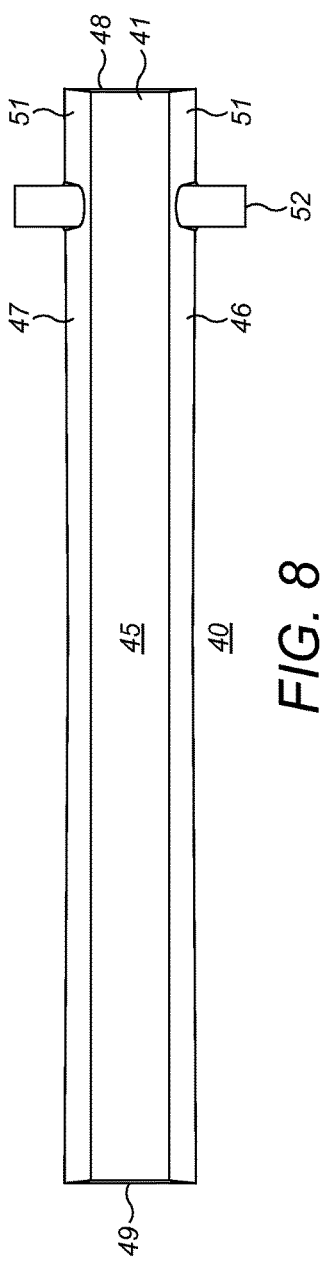

MULTI-PLATE BRAKE OR CLUTCH

CROSS-REFERENCE TO RELATED APPLICATIONS

This application is a national phase application of International Patent Application No. PCT/GB2015/050553, filed Feb. 25, 2015, which claims priority to Great Britain Patent Application No. GB 1407423.1, filed Apr. 28, 2014, both of which are incorporated by reference herein in their entireties for all purposes.

TECHNICAL FIELD

This disclosure is directed towards a multi-plate brake or clutch having a fluid dispensing device.

BACKGROUND

Multi-plate brakes and clutches are commonly used in vehicles with high torque requirements in vehicle braking applications and/or in power transfer applications. They usually comprise relatively similar components in the form of a carrier (also known as a hub) and a plurality of annular friction plates mounted to the carrier. External splines may be disposed around the periphery of the carrier and may engage with internal splines disposed about the inner edge of the friction plates. Annular reaction plates (also known as spacer plates) may be located in between adjacent friction plates and are mounted to an outer ring, which locates around the plates and carrier. The carrier may be provided with splines and the reaction plates and friction plates may slide on these splines along an axis of rotation of the carrier and/or outer ring. An actuator may be provided to move the reaction and friction plates towards one another.

In the case of a vehicle braking application, the carrier is usually rotatable and the outer ring is fixed. Therefore, the friction plates may rotate with the carrier whilst the reaction plates are fixed. When the friction plates and reaction plates are brought together (i.e. by the actuator), a frictional braking force may be provided that opposes the rotation force of the carrier.

In the case of a power transfer application using a clutch, the carrier and outer ring can both rotate such that the reaction plates rotate with the carrier and the friction plates rotate with the outer ring. When the friction plates and the reaction plates are brought together (i.e. by the actuator), a frictional force may be provided between the friction and reaction plates that will result in the carrier and outer ring rotating substantially together. The clutch therefore acts to transmit a torque between the carrier and outer ring.

Lubricating or cooling fluid, such as oil, may be supplied to the friction and reaction plates. Arrangements which apply such lubrication are commonly known as "wet running" multi-plate brakes or clutches. In addition to cooling and lubricating the plates, the fluid may assist in providing the frictional force between the reaction and friction plates. The fluid may form a film on the surfaces of the plates which prevents direct contact between the plates. The forces generated within the film may provide a resistance to rotation between the plates and thus provide the required frictional force. The avoidance of direct contact between the plates may result in reduced wear and thus prolong the life of the clutch or brake.

Various different arrangements of multi-plate brakes and clutches have previously been developed in attempts to provide sufficient fluid to the plates. For example, as is disclosed in US-A-2009/0194384 or U.S. Pat. No. 7,383,932, a number of holes may be provided through the carrier either in each spline or in the gaps in the carrier between each spline. The fluid is injected into the carrier and as the carrier rotates centrifugal forces direct the fluid through the holes in a direct path towards the plates.

However, the flow of fluid from such holes can only be directed to the plates that are directly adjacent to the holes. Therefore, the coolest fluid will only ever contact those plates directly adjacent to the holes. In addition, the fluid flow path to the plates furthest from the holes can be disrupted by the internal or external splines. As a result, there can be an uneven distribution of the fluid throughout the plates.

SUMMARY

The present disclosure provides a multi-plate brake or clutch comprising: a carrier, the carrier comprising: a carrier body; and a plurality of external splines located around a rim of the carrier body and extending outwardly from the rim, wherein the carrier comprises a passageway that extends through the carrier body to a passageway outlet; a fluid dispensing device comprising a body defining a reservoir for collecting fluid and an opening for allowing fluid to be dispensed from the reservoir, wherein the fluid dispensing device is located so that the reservoir is in fluid communication with the passageway outlet via the opening; and a plurality of friction plates located around the carrier and the fluid dispensing device, wherein the fluid dispensing device is arranged to allow fluid to be dispensed from the reservoir via the opening when a volume of fluid in the reservoir exceeds a predetermined volume.

The present disclosure further provides a fluid dispensing device for a multi-plate brake or clutch, the multi-plate brake or clutch comprising: a carrier, the carrier comprising: a carrier body; and a plurality of external splines located around a rim of the carrier body and extending outwardly from the rim, wherein the carrier comprises a passageway that extends through the carrier body to a passageway outlet; a plurality of friction plates located around the carrier, and wherein the fluid dispensing device comprises: a body comprising an inner side for locating adjacent to the carrier; and a reservoir in the body having an opening in the inner side for positioning adjacent to the passageway outlet and receiving fluid therefrom; wherein the fluid dispensing device is arranged to allow fluid to be dispensed from the reservoir via the opening when a volume of fluid in the reservoir exceeds a predetermined volume.

By way of example only, embodiments of a multi-plate brake or clutch are now described with reference to, and as shown in, the accompanying drawings.

BRIEF DESCRIPTION OF THE DRAWINGS

FIG. 6 is a plan view of the underside of the fluid dispensing device of FIG. 2;

FIG. 7 is a view of a side of the fluid dispensing device of FIG. 2;

FIG. 8 is a plan view of the top of the fluid dispensing device of FIG. 2; and

FIG. 9 is a view of an end of the fluid dispensing device of FIG. 2.

DETAILED DESCRIPTION

The present disclosure is generally directed towards a multi-plate brake or clutch, comprising a splined carrier, a plurality of friction plates and a fluid dispensing device mounted between the carrier and the plates. The fluid dispensing device may take the place of one of the splines of the carrier. The fluid dispensing device may be arranged to collect fluid within a reservoir and then dispense the fluid to the plates once the volume of fluid has reached a predetermined volume.

Figure 1:
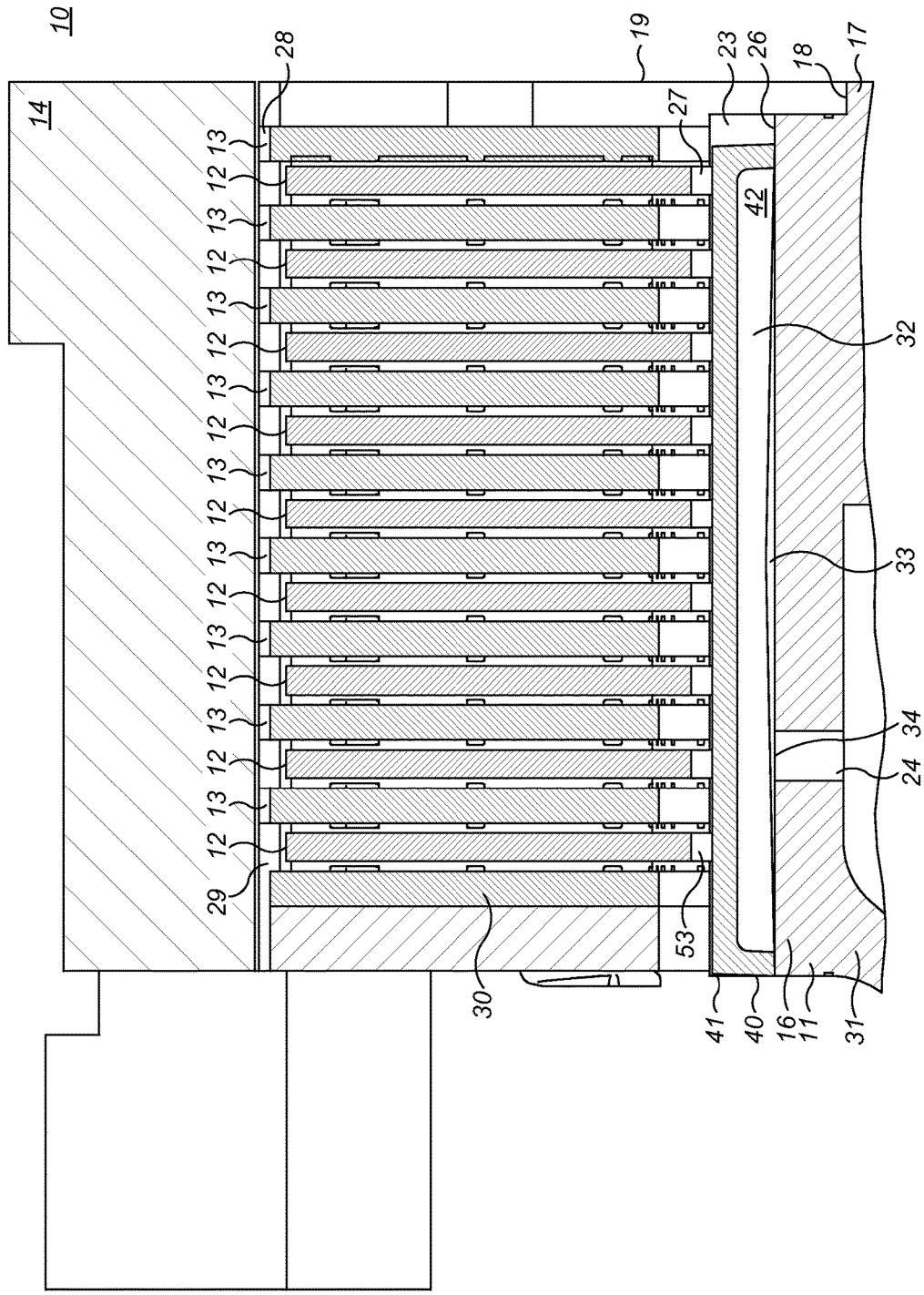
FIG. 1 is a cross-sectional view of a section of the multi-plate brake of the present disclosure.
Figure 2:
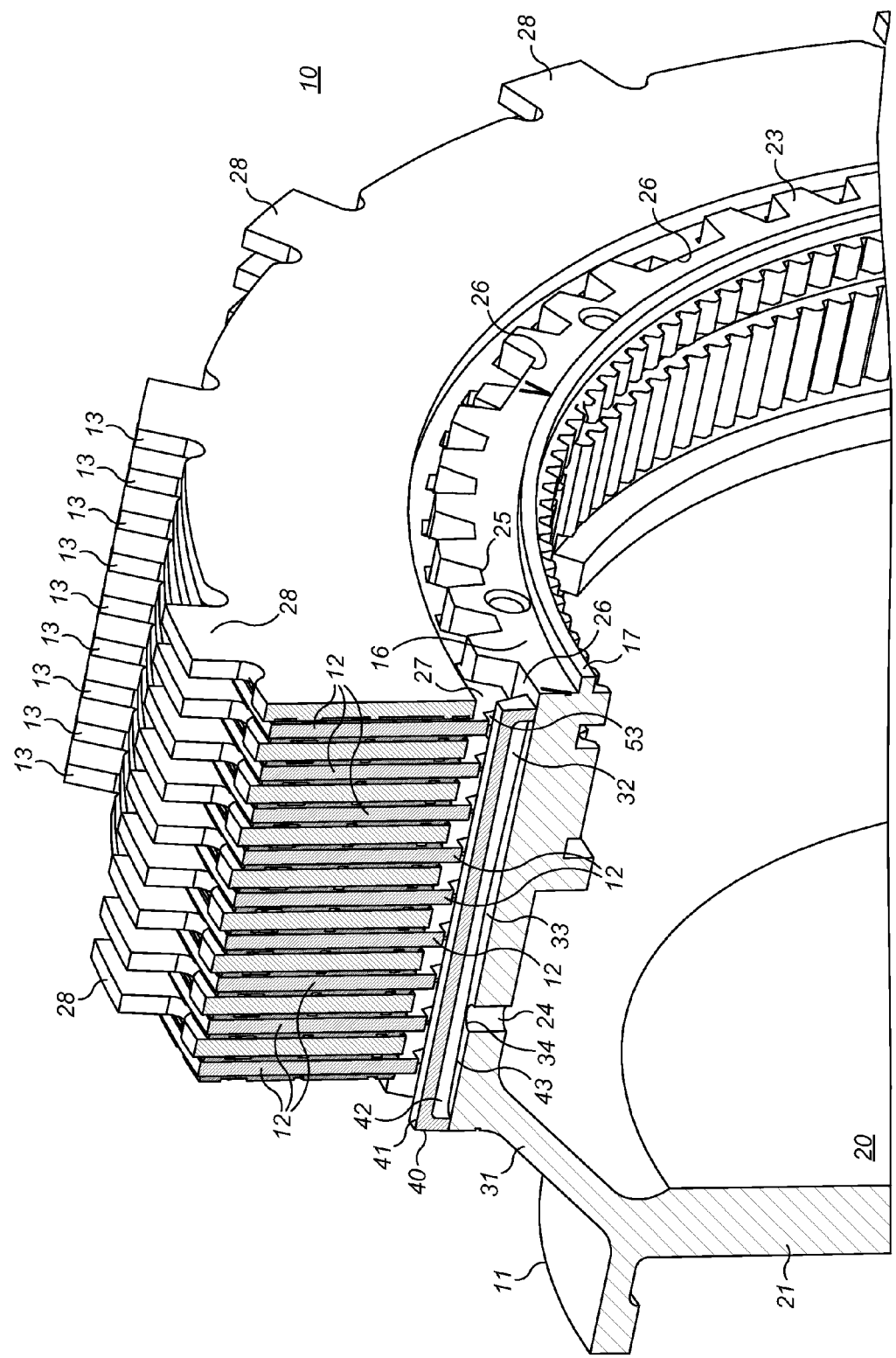
FIG. 2 is a perspective, partially cross-sectioned, view of the multi-plate brake of FIG. 1 illustrating a fluid dispensing device.

FIGS. 1 and 2 illustrate sections of a multi-plate brake 10 of the present disclosure. The multi-plate brake 10 may comprise a fluid dispensing device 40, a carrier 11, a plurality of friction plates 12, a plurality of reaction plates 13, an outer ring 14 and at least one actuation arrangement (not shown).

Figure 3:
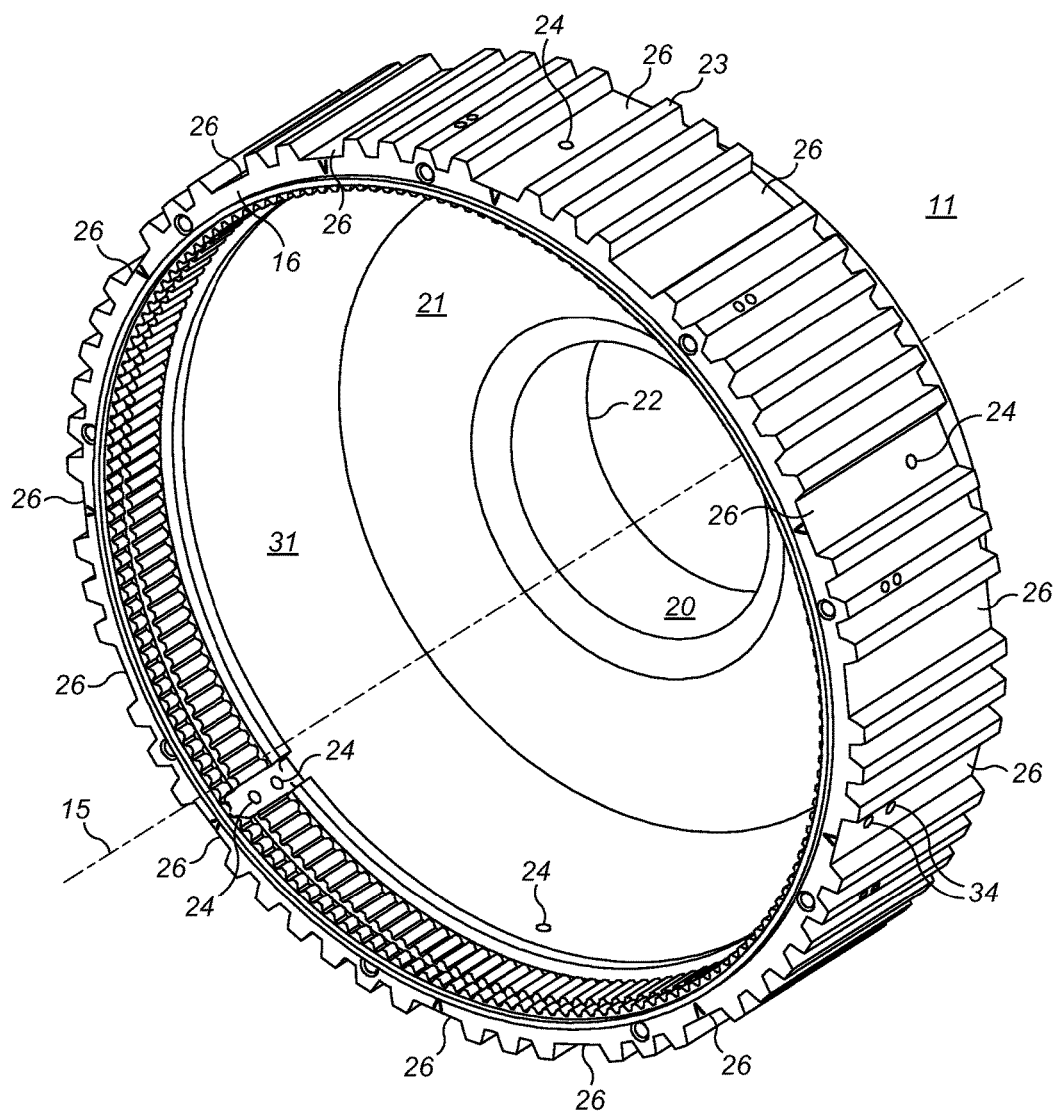
FIG. 3 is a perspective view of a carrier of the multi-plate brake of FIGS. 1 and 2.
Figure 4:
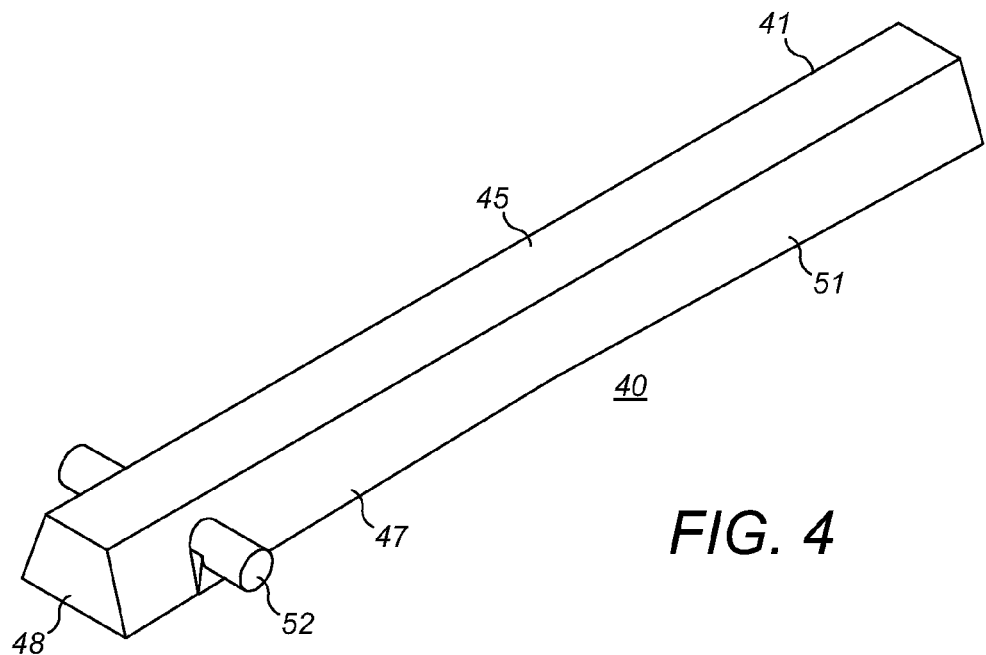
FIG. 4 is a perspective view of the top of the fluid dispensing device of FIG. 2.
Figure 5:
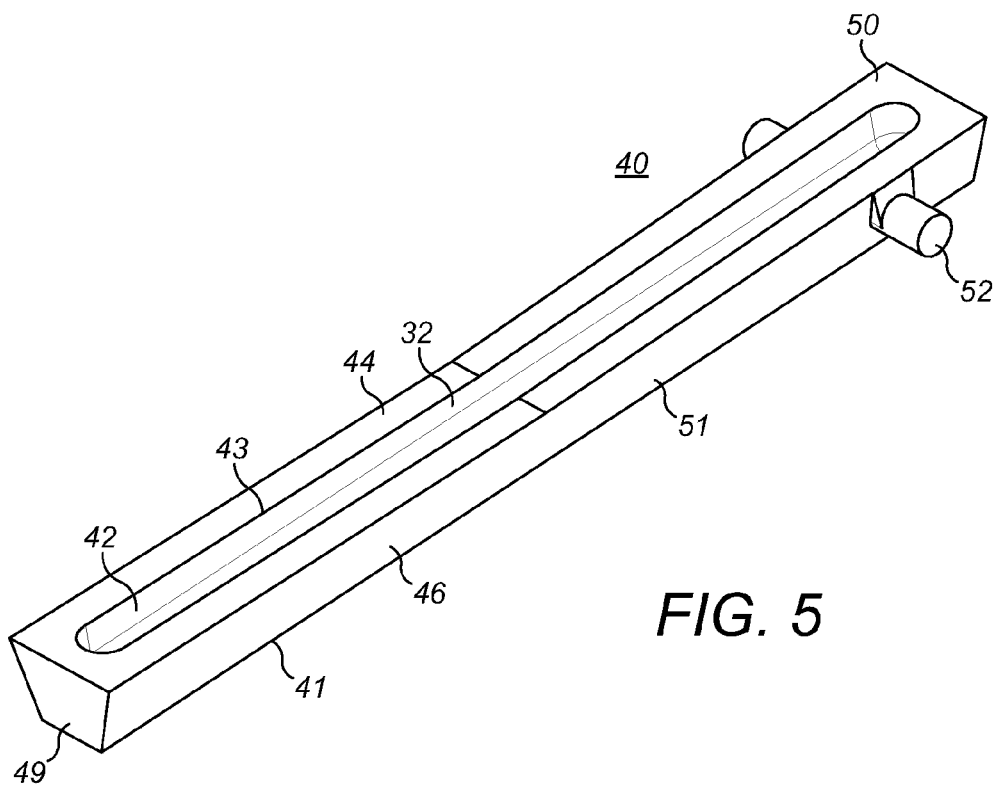
FIG. 5 is a perspective view of the underside of the fluid dispensing device of FIG. 2.

As further illustrated in FIG. 3, the carrier 11 may be arranged to rotate about an axis of rotation 15 and may be substantially symmetrical about the axis of rotation 15. The carrier 11 comprises a carrier body 31. The carrier body 31 comprises a rim 16, which may be formed as a substantially circular and hollow cylinder. The centre of the circular dimension of the cylinder may be coincident with the axis of rotation 15. The thickness of the rim 16 may be substantially less than its diameter. The rim 16 may comprise a lip 17 mounted within a guide 18 in a brake housing 19 for guiding the rim 16 during rotation.

The carrier body 31 may further comprise a shaft mounting portion 20 for mounting the rim 16 to a rotatable input shaft (not shown). The shaft mounting portion 20 may comprise a wall 21 extending from the inner side of the rim 16 towards the axis of rotation 15. As illustrated, the wall 21 may extend away from the rim 16 along the axis of rotation 15. The shaft mounting portion 20 may define a central aperture 22 for receiving the input shaft and may be sized to provide an interference fit such that the carrier 11 and input shaft may rotate together. A fluid inlet (not shown) may be provided in the carrier 11 and/or brake housing 19 for directing fluid from a fluid circuit to the internal volume of the carrier 11.

The carrier 11 may further comprise a plurality of external splines 23 extending outwardly from the rim 16. The external splines 23 may be elongate and may extend parallel to the axis of rotation 15. The external splines 23 may be equally spaced around the rim 16. The width of each external spline 23 (i.e. the distance each external spline 23 extends around an external periphery defined by the rim 16) may inwardly taper in a radially outward direction. Thus each external spline 23 may be shaped as an elongate trapezoidal prism.

A passageway 24 may extend through the rim 16 to a passageway outlet 34 for allowing fluid to flow from the inside of the carrier 11 to the friction and reaction plates 12, 13. As illustrated in FIG. 3, a plurality of passageways 24 may be spaced around the rim 16. Each space between adjacent pairs of external splines 23 may be referred to as a valley 25 and each passageway 24 may extend to a valley 25.

Valleys 25 that are associated with passageways 24, referred to as a passageway valley 26, may be wider than the valleys 25 that are not associated with passageways 24. A passageway valley 26 may have a width that is greater than the width of an external spline 23. Each passageway valley 26 may have the same width as the sum of the widths of an external spline 23 and two valleys 25. Each passageway valley 26 may be formed by removing (for example, using a milling process), an external spline 23 from the carrier 11.

The friction plates 12 may be located around the external splines 23 and fluid dispensing device 40. The friction plates 12 may be spaced from one another along the axis of rotation 15 of the carrier 11 and may be able to move or slide along the carrier 11 along the axis of rotation 15. Each friction plate 12 may comprise an annular disc having inner and outer edges and diameters. The centre point of the annular disc may be coincident with the axis of rotation 15 of the carrier 11. Each friction plate 12 may comprise grooves on at least one of its faces to allow fluid to flow across the face(s). Each friction plate 12 may comprise a plurality of internal splines 27 extending around and protruding inwardly from the inner diameter. The internal splines 27 may be equally spaced around the inner diameter and may be sized and shaped to interlock with or engage the external splines 23 of the carrier 11. The internal splines 27 may be arranged to hold the fluid dispensing device 40 in a passageway valley 26.

The reaction plates 13 may also be located around, but not in contact with, the carrier 11. Each reaction plate 13 may be spaced from one another along the axis of rotation 15 of the carrier 11. Each reaction plate 13 may comprise an annular disc having inner and outer edges and diameters. The centre point of the annular disc may be coincident with the axis of rotation 15 of the carrier 11. Each reaction plate 13 may comprise a plurality of external splines 28 extending around and protruding outwardly from the outer diameter. The external splines 28 may be equally spaced around the outer diameter.

The outer ring 14 may be formed from a hollow cylinder having a substantially circular cross section. The centre of the circular dimension of the outer ring 14 may be coincident with the axis of rotation 15 of the carrier 11. The thickness of the outer ring 14 may be substantially less than its diameter. The outer ring 14 may substantially enclose the carrier 11, the reaction plates 13 and the friction plates 12. The outer ring 14 may be fixed to the brake housing 19 or other housing of the multi-plate brake 10 such that it cannot rotate.

The reaction plates 13 may be mounted to the outer ring 14 such that they cannot rotate relative thereto. The reaction plates 13 may however be able to move along the outer ring 14 along the axis of rotation 15 of the carrier 11. A plurality of internal splines 29 may be provided around the inner side of the outer ring 14 engaging with the external splines 28 of the reaction plates 13. These internal splines 29 may be sized and shaped to interlock with the external splines 28 of the reaction plates 13.

The actuation arrangement may be arranged to move the friction and reaction plates 12, 13 together. The actuation arrangement may comprise a member for contacting an end reaction plate 13 and an actuator for moving the member. The actuator may comprise a spring biased hydraulic actuator having a piston for contacting the member and thereby moving the member upon actuation.

An end stop 30 may be attached to the brake housing 19 and/or outer ring 14 on the opposing side of the friction and reaction plates 12, 13 to the actuation arrangement. The end stop 30 may be a backing plate. The end stop 30 may be arranged to prevent the friction and reaction plates 12, 13 from moving along the axis of rotation 15 beyond a predetermined point when the actuation arrangement brings the friction and reaction plates 12, 13 together.

FIGS. 4 to 9 illustrate the fluid dispensing device 40 of the present disclosure in further detail. The fluid dispensing device 40 comprises a body 41 defining a reservoir 42 for collecting fluid and an opening 43. The opening 43 allows fluid to be dispensed from the reservoir 42 when a volume of fluid in the reservoir 42 exceeds a predetermined volume.

The body 41 may comprise an inner side 44, an outer side 45, a first side wall 46, a second side wall 47, a first end 48 and a second end 49. The body 41 may be elongate and the axis of elongation may be, when the fluid dispensing device 40 is inserted into the multi-plate brake 10, parallel to the axis of rotation 15 of the carrier 11. The body 41 may be elongate along the inner side 44, outer side 45, first side wall 46 and second side wall 47. The body 41 may be substantially the same shape and/or size as one of the external splines 23 of the carrier 11.

The body 41 may have the shape of a trapezoidal prism. Alternatively, the body 41 may take other shapes such as a rectangular or square prism. The first and second ends 48, 49 may oppose one another along the axis of rotation 15 of the carrier 11 and may be in the shape of a trapezoid. The first and second ends 48, 49 may be arranged such that edges having the greatest length are positioned nearest to the carrier 11 and the opposing edges are positioned away from the carrier 11. Therefore, a surface area of the outer side 45 that is joined by the first and second ends 48, 49 may be smaller than a surface area of the inner side 44. The outer side 45 may be a substantially flat planar surface in the shape of a rectangle. The first and second side walls 46, 47 extend from the outer side 45 to the inner side 44 at an acute angle to the angle of the plane of the outer side 45.

The inner side 44 may comprise an inner surface 50 substantially in the shape of a rectangular annulus. The inner edge of the inner surface 50 may define the reservoir 42 as a recess extending into the body 41 from the opening 43 in the inner side 44. The recess may extend into at least half of the height of the body 41 towards the outer side 45. The recess may extend along the inner side between the first and second ends 48, 49, i.e. in the elongate direction parallel to the axis of rotation 15 of the carrier 11. The recess may be formed by a continuous inner surface 32 of the fluid dispensing device 40.

A gap 33 may be formed between at least a part of the inner side 44 of the body 41 and the carrier 11 when the multi-plate brake 10 is assembled. Each of the first and second side walls 46, 47 may comprise a surface 51 having a height tapered from the middle towards the first and second ends 48, 49. Therefore, the body 41 may have a smaller height at its centre than at its first and second ends 48, 49. The ends of the inner side 44 may be the only parts of the body 41 able to contact the carrier 11 when the multi-plate brake 10 is assembled. Thus the opening 43 and gap 33 may allow fluid to be dispensed from the reservoir 42, between the body 41 and the rim 16, and towards the friction plates 12, when a volume of fluid in the reservoir 42 exceeds a predetermined volume.

Alternatively and/or in addition to the gap 33 one or more through-holes (not shown in the Figures) may be provided through the at least one of the first and second side walls 46, 47. The through-hole may be formed as an elongate slot extending along at least one of the first and second side walls 46, 47. The through-hole may allow fluid to be dispensed from the reservoir 42 and towards the friction plates 12 when a volume of fluid in the reservoir 42 exceeds a predetermined volume. The fluid dispensing device 40 may alternatively comprise no through-holes.

The fluid dispensing device 40 may further comprise one or more pins 52 extending through the body 41 for locating the fluid dispensing device 40 so that the reservoir 42 is in fluid communication with the passageway outlet 34 via the opening 42. More particularly, the one or more pins 52 may locate the fluid dispensing device 40 in a passageway valley 26. As illustrated, there may be a pin 52 extending outwardly from each of the first and second side walls 46, 47 along an axis substantially perpendicular to the axis of rotation 15 of the carrier 11. The pins 52 may be cast integrally with the body 41 or may be provided separately from the fluid dispensing device 40.

For example, the pin 52 may extend through both the first and second side walls 46, 47 along an axis substantially perpendicular to the axis of rotation 15 of the carrier 11. The pin 52 may be a solid cylinder (as illustrated) or any other suitable shape, such as a square prism, hollow tube or the like. The pin 52 may extend through a hole in the body 41 or be located in a groove cut into the body 41 from the inner side 44. The pin 52 may be attached to the body 41 by fixing means, such as adhesive or complementary threads.

When the multi-plate brake 10 is assembled, the fluid dispensing device 40 may be located in between an adjacent pair of external splines 23 of the carrier 11 with the reservoir 42 in fluid communication with a passageway 24 via a passageway outlet 34. Thus the recess may overlie the passageway outlet and the fluid dispensing device 40 may be located in a passageway valley 26 on the rim 16. The fluid dispensing device 40 may be held in place by the friction plates 12 via the one or more pins 52. Adjacent internal splines 27 of each friction plate 12 may be located on either side of the body 41. This may prevent movement of the fluid dispensing device 40 around the carrier 11 (i.e. around the axis of rotation 15) and away from the carrier 11.

The one or more pins 52 may be arranged to enable the fluid dispensing device 40 to move relative to the carrier 11 by being guided by one or more friction plates 12. Each pin 52 may be arranged such that it is located between internal splines 27 of adjacent friction plates 12. This may prevent movement of the fluid dispensing device 40 along the axis of rotation 15 of the carrier 11 (i.e. parallel to the external splines 23 of the carrier 11) when the friction plates 12 are stationary. When the friction plates 12 move along the carrier 11, such as when the actuation arrangement brings the friction plates 12 and reaction plates 13 together, internal splines 27 of the friction plates 12 may contact the one or more pins 52 and thereby move the fluid dispensing device 40 with the friction plates 12.

The pin 52 may also extend from one external spline 23 of the carrier, through the body 41 and to an adjacent external spline 23. This may further prevent movement of the fluid dispensing device 40 around the carrier 11.

The fluid dispensing device 40 may be able to move relative to the carrier 11 and/or friction plates 12. The body 41 may be slightly smaller than the space between the internal splines 27 of the frictions plates 12 such that a gap 53 is provided therebetween. The gap 53 may be large enough to enable the body 41 to move away from the carrier 11, but small enough to ensure that the fluid dispensing device 40 remains in place such that fluid can be communicated from the passageway 24 to the reservoir 42.

A plurality of fluid dispensing devices 40 may be provided. Thus the carrier 11 may comprise a plurality of passageway valleys 26 and passageways 24 through the carrier body 31. Furthermore, as illustrated in FIG. 3, a plurality of passageways 24 may extend through the rim 16 to each passageway valley 26.

The body 41 and pin 52 may be formed from any suitable material, such as stainless steel. In particular, the fluid dispensing device 40 may be formed as a unitary piece by casting.

In an alternative arrangement the fluid dispensing device 40 may be provided on the top of one of the external splines 23 of the carrier 11. Each passageway 24 may extend through the rim 16 and through one of the external splines 23 such that the passageway outlet 34 is provided on the external spline 23. The internal spline 27 of the friction plates 12 adjacent to the fluid dispensing device 40 may be adapted to receive the fluid dispensing device 40 on top of one of the external splines 23. For example, the depth of the valleys of the between the internal splines 27 may be increased. Alternatively, the height of the external splines 23 of the carrier 11 may be reduced such that the dimensions of the friction plates 12 remain substantially the same. The opening 43 may thus be formed between the body 41 and the external splines 23 of the carrier 11 rather than between the body 41 and the rim 16. Fluid may flow from between the external splines 23 and body 41 and towards the friction and reaction plates 12, 13.

INDUSTRIAL APPLICABILITY

In use the carrier 11 may rotate and, when required, the actuator may be actuated to bring the friction and reaction plates 12, 13 together to provide a braking force. Fluid may enter the internal volume of the carrier 11 via the fluid inlet. Centrifugal forces resulting from the rotation of the carrier 11 may direct the fluid to the rim 16 and thus to the passageway 24. The fluid may flow through the passageway 24 into the reservoir 42.

The centrifugal forces may maintain the fluid within the reservoir 42 until the volume of fluid therein reaches a predetermined volume. The predetermined volume may be the volume of the space enclosed by the reservoir 42. Upon reaching the predetermined volume the fluid may overflow from the reservoir 42. Thus fluid may flow out of the opening 43 and towards the friction and reaction plates 12, 13. As the opening 43 is elongate and extends across several friction and reaction plates 12, 13 the fluid may be spread out evenly thereacross. In addition, as the opening 43 is tapered from its centre, more fluid may be dispensed towards the centre of the friction and reaction plates 12, 13 where more cooling is required.

As the reaction and friction plates 12, 13 are moved together, the fluid dispensing device 40 may move with them, particularly if guided by the contact between one or more pins 52 and the friction plates 12. Thus an even spread of fluid may be provided across the friction and reaction plates 12, 13, regardless of where they are positioned on the carrier 11 and outer ring 14.

In addition, if the body 41 is arranged to move away from the carrier 11, for example by being slightly smaller than the space between the internal splines 27 of the friction plates 12, more fluid may be dispensed from the reservoir 42 to the friction and reaction plates 12, 13. The body 41 may move away, at least in part, from the carrier 11 by action of the centrifugal forces and "float" on a film of fluid between the body 41 and the carrier 11.

In the exemplary embodiments of the present disclosure described herein with reference to FIGS. 1 to 8, the fluid dispensing device 40 is described to have a tapered first and second side walls 46, 47 and the gap 33 to encourage fluid flow from the centre of the fluid dispensing device 40. In alternative exemplary embodiments, no such tapering will be apparent. Instead, the first and second side walls 46, 47 may be straight. The fluid may be dispensed from the reservoir 42 through a gap formed between the fluid dispensing device 40 and carrier 11 when the fluid dispensing device 40 moves away from the carrier 11 (as previously discussed herein).

In the exemplary embodiments of the present disclosure described herein with reference to FIGS. 1 to 8, a location pin 52 is used to maintain the positioning of the fluid dispensing device 40 relative to the friction plates 12. However, it will be appreciated that many other suitable structural supports, location means and/or fixtures will be suitable to maintain the fluid dispensing device 40 in position whilst allowing the movement discussed herein.

Whilst exemplary embodiments of the present disclosure described herein with reference to FIGS. 1 to 8 refer to a movable fluid dispensing device 40, it will be appreciated that in other exemplary embodiments, the fluid dispensing device 40 need not be movable but instead may be fixed in place at a predefined separation distance from the carrier 11.

The above disclosure is particularly directed to an example of a multi-plate brake 10. However, the principles of the disclosure are equally applicable to and suitable for other multi-plate devices such as energy conversion or torque transferring devices. For example, the principles of the disclosure may be applicable to multi-plate clutches. For example, in a clutch the fluid dispensing device 40 may be provided around the carrier 11 even if the outer ring 14 is rotatable rather than fixed as in the aforementioned multi-plate brake 10.

The invention claimed is:

1. A multi-plate brake or clutch comprising:
a carrier, the carrier comprising:
a carrier body; and
a plurality of external splines located around a rim of the carrier body and extending outwardly from an outer surface of the rim that extends between adjacent ones of the plurality of external splines, and wherein the carrier comprises a passageway that extends through the carrier body to a passageway outlet;
a fluid dispensing device comprising a device body defining a reservoir for collecting fluid and an opening for allowing fluid to be dispensed from the reservoir, wherein the fluid dispensing device is located so that the reservoir is in fluid communication with the passageway outlet via the opening; and
a plurality of friction plates located around the carrier and the fluid dispensing device, wherein the fluid dispensing device is mounted such that the reservoir is located outwardly of the outer surface of the rim and arranged to allow fluid to be dispensed from the reservoir via the opening when a volume of fluid in the reservoir exceeds a predetermined volume.

2. A multi-plate brake or clutch as claimed in claim 1 wherein the reservoir is defined by a recess in the device body that extends from the opening in a direction radially outwards away from the carrier and towards the friction plates.

3. A multi-plate brake or clutch as claimed in claim 2 wherein the recess is formed by a continuous inner surface of the fluid dispensing device.

4. A multi-plate brake or clutch as claimed in claim 1 wherein the opening of the fluid dispensing device faces the passageway outlet.

5. A multi-plate brake or clutch as claimed in claim 1 wherein the device body comprises first and second side walls and is arranged such that a gap is formed between at least one of the first and second side walls and the carrier.

6. A multi-brake or clutch as claimed in claim 5 wherein the first and second side walls are tapered such that the gap is larger at a centre of the device body than towards opposing ends of the device body.

7. A multi-plate brake or clutch as claimed in claim 1 wherein the friction plates and fluid dispensing device are arranged such that the fluid dispensing device can at least partly move away from the carrier.

8. A multi-plate brake or clutch as claimed in claim 7 wherein a gap is provided between the fluid dispensing device and the friction plates such that the device body can move away from the rim.

9. A multi-plate brake or clutch as claimed in claim 1 wherein each friction plate comprises a plurality of internal splines and the plurality of internal splines are arranged to engage with the external splines and are arranged to hold the fluid dispensing device adjacent to the carrier.

10. A multi-plate brake or clutch as claimed in claim 1 comprising location means arranged to enable the fluid dispensing device to be located around the carrier so that the reservoir is in fluid communication with the passageway outlet via the opening.

11. A multi-plate brake or clutch as claimed in claim 10, wherein the location means is arranged to enable the fluid dispensing device to move relative to the carrier and be guided by one or more friction plates.

12. A multi-plate brake or clutch as claimed in claim 10, wherein the location means comprises a pin located between internal splines of two friction plates.

13. The multi-plate brake or clutch of claim 1 wherein the fluid dispensing device is mounted upon the rim between two of the plurality of external splines.

14. The multi-plate brake or clutch of claim 1 wherein the carrier body defines an axis of rotation, and the reservoir is elongate in an axial direction within the device body.

15. A multi-plate brake or clutch comprising:
  a carrier, the carrier comprising:
    a carrier body; and
    a plurality of external splines located around a rim of the carrier body and extending outwardly from the rim, wherein the carrier comprises a passageway that extends through the carrier body to a passageway outlet;
  a fluid dispensing device comprising a device body defining a reservoir collecting fluid and an opening for allowing fluid to be dispensed from the reservoir, wherein the fluid dispensing device is located so that the reservoir is in fluid communication with the passageway outlet vie the opening; and
  a plurality of friction plates located around the carrier and the fluid dispensing device, wherein the fluid dispensing device is arranged to allow fluid to be dispensed from the reservoir via the opening when a volume of fluid in the reservoir exceeds a predetermined volume;
  the fluid dispensing device is one of a plurality of fluid dispensing devices, and wherein the carrier comprises a plurality of corresponding passageways.

16. A fluid dispensing device for a multi-plate brake or clutch, the multi-plate brake or clutch comprising:
  a carrier, the carrier comprising:
    a carrier body; and
  a plurality of external splines located around a rim of the carrier body and extending outwardly from the rim, wherein the carrier comprises a passageway that extends through the carrier body to a passageway outlet;
  a plurality of friction plates located around the carrier, and wherein the fluid dispensing device comprises:
  a device body comprising an inner side for locating adjacent to the carrier; and
  a reservoir in the device body having an opening in the inner side for positioning adjacent to the passageway outlet and receiving fluid therefrom;
  location means arranged to enable the fluid dispensing device to be located around the carrier so that the reservoir is in fluid communication with the passageway outlet via the opening, and the location means being arranged to enable the fluid dispensing device to move relative to the carrier and be guided by one or more friction plates;
  wherein the fluid dispensing device is arranged to allow fluid to be dispensed from the reservoir via the opening when a volume of fluid in the reservoir exceeds a predetermined volume.

17. A fluid dispensing device as claimed in claim 16 wherein the location means includes a pin extending through the device body.

* * * * *